US008958933B2

(12) United States Patent
Abihana

(10) Patent No.: US 8,958,933 B2
(45) Date of Patent: Feb. 17, 2015

(54) ENGINE CONTROL SYSTEM

(75) Inventor: Osama A Abihana, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 429 days.

(21) Appl. No.: 13/353,782

(22) Filed: Jan. 19, 2012

(65) Prior Publication Data
US 2013/0190954 A1 Jul. 25, 2013

(51) Int. Cl.
*B60W 20/00* (2006.01)
*F01P 7/16* (2006.01)
*B60W 10/198* (2012.01)
*B60W 30/18* (2012.01)
*B60W 10/06* (2006.01)

(52) U.S. Cl.
CPC .............. *B60W 20/00* (2013.01); *F01P 7/164* (2013.01); *B60W 10/198* (2013.01); *B60W 30/18136* (2013.01); *B60W 10/06* (2013.01); *B60Y 2300/46* (2013.01)
USPC .......................................................... 701/22

(58) Field of Classification Search
CPC ........... B60H 1/00642; B60H 1/00764; B60H 1/00885; B60H 1/00899; B60H 1/04; B60H 1/06; B60H 1/32; B60H 1/3204; B60H 1/3205; B60H 1/3208; B60H 1/3219; B60H 1/322; B60H 1/3222; B60H 1/3223; B60W 10/06; B60W 10/08; B60W 10/10; B60W 20/00; B60W 30/18072; B60W 30/18109; B60W 30/18136; F01P 7/14; F01P 7/16; F01P 7/167; F01P 7/164
USPC .......................................................... 701/22
See application file for complete search history.

(56) References Cited

U.S. PATENT DOCUMENTS

2004/0065275 A1  4/2004  Hayami et al.
2004/0103862 A1  6/2004  Aidnik

FOREIGN PATENT DOCUMENTS

EP          0965737 B1    6/1999

*Primary Examiner* — Jerrah Edwards
(74) *Attorney, Agent, or Firm* — Julia Voutyras; Alleman Hall McCoy Russell & Tuttle LLP

(57) ABSTRACT

Methods and systems are provided for adjusting the operation of an electric coolant pump in a hybrid vehicle system. During vehicle compression braking conditions, a motor propels the vehicle while the engine spins un-fueled to absorb torque. During such conditions, the coolant pump is operated based on the absorbed torque to maintain an engine temperature within a threshold.

17 Claims, 3 Drawing Sheets

ENGINE CONTROL SYSTEM

FIELD

The present description relates generally to a control system for maintaining an engine temperature during extended periods of compression braking.

BACKGROUND/SUMMARY

Engines may be configured with mechanical coolant pumps that circulate coolant through a cylinder head in addition to providing heat to a passenger compartment of a vehicle. Engine control systems may be configured to adjust the operation of the coolant pump based on engine temperature so as to maintain cylinder head temperatures. In some vehicle systems, such as hybrid electric vehicles, an electric auxiliary pump may also be included to assist the primary mechanical coolant pump.

One example of an engine system wherein an auxiliary pump is used with an engine-driven pump is disclosed by Aidnik in US 2004/0103862. Therein, a mechanical coolant pump provides coolant circulation during most driving conditions while an electric coolant pump is activated primarily during deceleration and after the engine is shut down. In particular, above a threshold engine speed, the mechanical pump is turned on while the electric coolant pump is cycled based on coolant temperature to provide auxiliary cooling control.

However, the inventors herein have identified potential issues with such a system. As one example, the amount of heat generated by the engine and/or the rate at which heat is generated at the engine may vary based on the nature of braking used during the deceleration conditions. For example, during conditions when the vehicle is decelerated using retarding forces within the engine (that is, compression braking), more heat may be generated at the engine as compared to conditions where the vehicle is decelerated using regenerative braking. As such, during compression braking, as the energy absorbed by the engine increases, more waste heat is generated that needs to be dissipated. Thus, if the coolant pump is operated based on the coolant temperature, as in the system of Aidnik, by the time the coolant pump is run, the coolant flow required to reduce the cylinder head temperatures may be substantially high. As such, this may increase the power consumption of the coolant pump. Further, even with the coolant pump operating at full flow at the time when coolant temperatures are high, cylinder head temperatures may not be reduced to desired levels in a suitable amount of time. As such, this may lead to localized boiling and coolant degradation.

In one example, some of the above issues may be addressed by a method of operating a hybrid vehicle system including an engine and a motor comprising, during conditions when the vehicle is propelled by the motor while the engine spins un-fueled, absorbing torque at the engine to maintain vehicle speed at a desired speed while adjusting operation of an engine coolant pump based on the absorbed torque to control engine temperature. In this way, coolant pump operation may be initiated and adjusted based on a compression braking torque to provide improved cooling control.

As an example, a hybrid vehicle system may include an electrically operated coolant pump. During conditions when the hybrid vehicle is propelled with only the motor, and the engine is spinning un-fueled while absorbing torque, such as during compression braking conditions, the coolant pump may be operated. In one example, pump operation may be initiated based on the vehicle speed relative to a radiator fan speed, so that coolant may start to be pumped through the engine as soon as compression braking starts. Then, as the amount of braking increases and the engine absorbs more torque, coolant pump operation (e.g., pump speed, pump flow, pump duty cycle, etc.) may be increased so that the pump operation can match engine heat generation.

In this way, by adjusting a coolant pump operation based on an engine compression braking torque, engine temperatures may be better controlled. Specifically, by increasing the amount of coolant flow with increased compression braking torque, it may be possible to better control the cylinder head temperatures while operating the coolant pump more efficiently.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
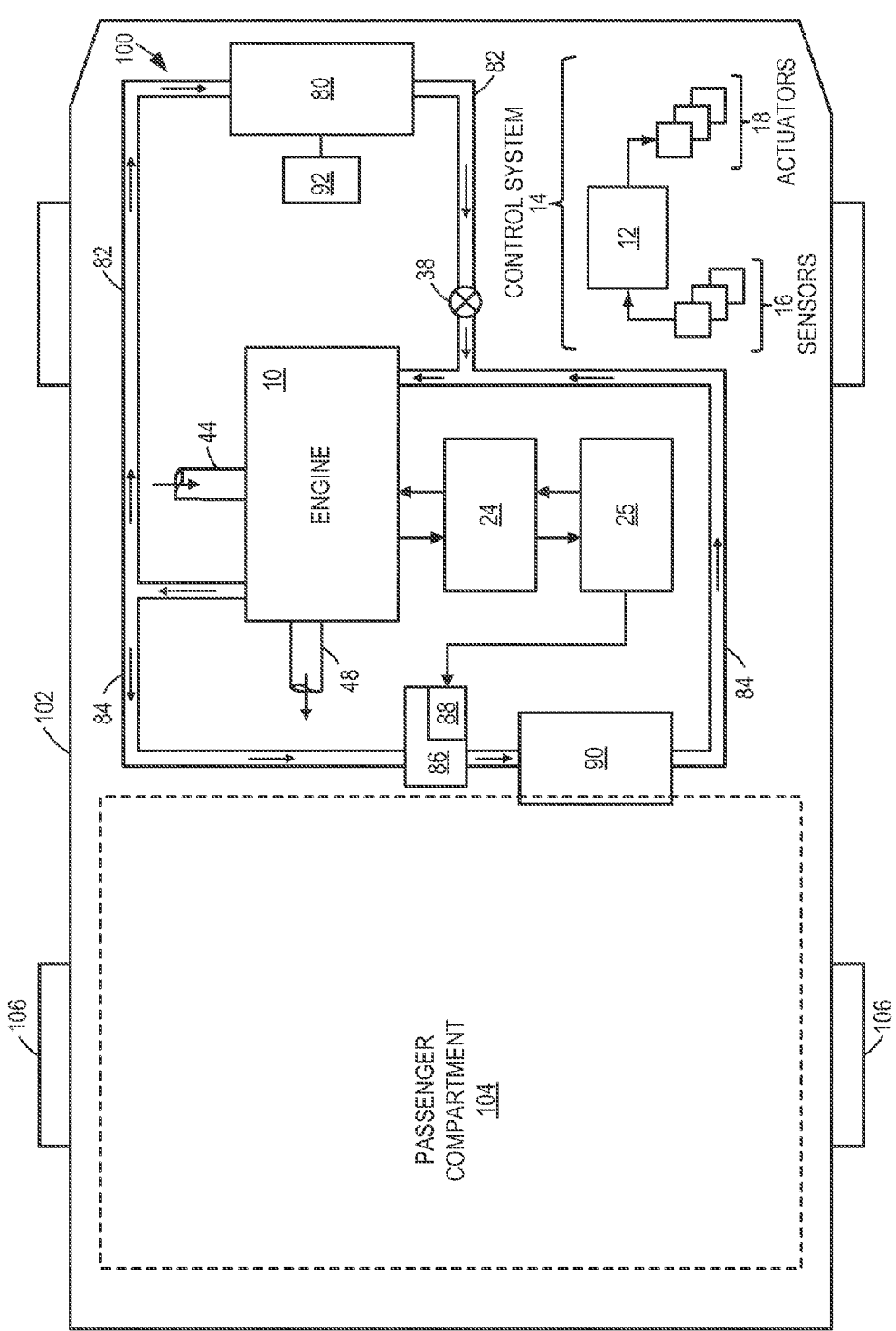
FIG. 1 shows a schematic depiction of a cooling system in a hybrid electric vehicle.

The following description relates to methods and systems for adjusting the operation of an auxiliary engine coolant pump, such as the coolant pump of FIG. 1, based on an amount of engine compression braking torque. During conditions when a vehicle is being propelled by a motor and the engine is spinning un-fueled, heat generated by the engine due to the absorption of torque may be dissipated by operating an engine coolant pump. A controller may be configured to perform a control routine, such as the example method of FIG. 2, to cyclically operate the engine coolant pump based on the vehicle speed and the compression braking torque to maintain an engine temperature below a threshold. An example coolant pump operation is described herein with reference to FIG. 3. In this way, engine temperatures may be maintained even during compression braking without degrading the efficiency of a coolant pump.

Turning now to FIG. 1, an example embodiment of a cooling system 100 in a hybrid vehicle 102 is illustrated schematically. Cooling system 100 circulates coolant through internal combustion engine 10 to absorb waste heat and distributes the heated coolant to radiator 80 and/or heater core 90 via coolant lines 82 and 84, respectively.

In particular, FIG. 1 shows cooling system 100 coupled to engine 10 and circulating engine coolant from engine 10 to radiator 80 and back to engine 10 via coolant line 82. Coolant may also flow through coolant line 84 to heater core 90 where the heat may be transferred to passenger compartment 104. The coolant then flows back to engine 10. An electrically operated coolant pump 86 may be coupled to the engine, and rotated by operating motor 88 using energy from an energy storage device 25, such as a battery. Electric pump 86 may operate to circulate the coolant through both coolant lines 82 and 84. The electric pump 86 circulates coolant through passages in the engine block, head, etc., to absorb engine heat, which is then transferred via the radiator 80 to ambient air. In an example where pump 86 is a centrifugal pump, the pressure (and resulting flow) produced by pump 86 may be proportional to an amount of power supplied to the pump by the energy storage device 25. The temperature of the coolant may be regulated by a thermostat valve 38, located in the cooling line 82, which may be kept closed until the coolant reaches a threshold temperature.

Further, fan 92 may be coupled to radiator 80 in order to maintain an airflow through radiator 80 when vehicle 102 is moving slowly or stopped while the engine is running. In some examples, fan speed may be controlled by controller 12. Further still, fan 92 may be coupled to pump 86 such that fan 92 may be rotated at a speed proportional to the pump speed, such as a 1:1 speed ratio. In another example, as speed of pump 86 increases, speed of fan 92 may also be increased. Optionally, a heater core fan may also be coupled to pump 86 and may be operated at a speed proportional to pump 86, such as a 1:1 speed ratio.

In this example embodiment, the hybrid vehicle system includes an energy conversion device 24, which may include a motor, a generator, among others and combinations thereof. The energy conversion device 24 is further shown coupled to an energy storage device 25, which may include a battery, a capacitor, a flywheel, a pressure vessel, etc. The energy conversion device 24 may be operated to absorb energy from vehicle motion and/or the engine and convert the absorbed energy to an energy form suitable for storage by the energy storage device 25 (e.g., provide a generator operation). The energy conversion device may also be operated to supply an output (power, work, torque, speed, etc.) to the drive wheels 106, engine 10 (e.g., provide a motor operation), and pump 86. It should be appreciated that the energy conversion device may, in some embodiments, include only a motor, only a generator, or both a motor and generator, among various other components used for providing the appropriate conversion of energy between the energy storage device and the vehicle drive wheels and/or engine.

Hybrid-electric propulsion embodiments may include full hybrid systems, in which the vehicle is propelled only by the engine, the vehicle is propelled only by the motor (that is, the energy conversion device), or a combination of both. Assist or mild hybrid configurations may also be employed, in which the engine is the primary torque source, with the motor acting to selectively deliver added torque, for example during tip-in or other conditions. Further still, starter/generator and/or smart alternator systems may also be used. Additionally, the various components described above may be controlled by vehicle controller 12 (described below).

From the above, it should be understood that the exemplary hybrid-electric propulsion system is capable of various modes of operation. For example, vehicle 102 may be operated in an "engine-only" mode, wherein engine 10 acts as the only torque source powering drive wheel 106 and propelling the vehicle. During the "engine-only" mode, fuel may be supplied to engine 10 from a fuel tank via a fuel injector (not shown) so that the engine can spin fueled to provide the torque for propelling the vehicle. Optionally, engine 10 can be operated to output more torque than is needed for propulsion, in which case the additional power is absorbed by the energy conversion device 24 (in generating mode) to charge the energy storage device 25 or supply electrical power for other vehicle loads.

As another example, vehicle 102 may be operated in an "assist" mode wherein engine 10 is operated and used as the primary source of torque for powering drive wheels 106 and the electric motor (energy conversion device 24) is used as an additional torque source to act in cooperation with, and supplement the torque provided by, engine 10. During the "assist" mode, as in the engine-only mode, fuel is supplied to engine 10 so as to spin the engine fueled and provide torque to the vehicle wheels.

In still another example, vehicle 102 may be operated in an "electric-only" mode wherein the energy conversion device, such as a battery-powered electric motor, is operated and used as the only source of torque for powering drive wheels 106 and propelling vehicle 102. As such, during the engine-off mode, no fuel may be injected into engine 10 irrespective of whether the engine is spinning or not. The "electric-only" mode may be employed, for example, during braking, low speeds, while stopped at traffic lights, etc. During some decelerative events that occur while the vehicle is in the electric-only mode of operation, the energy conversion device 24 may be operated as a generator to convert and store the wheel torque of the decelerating vehicle as charge in energy storage device 25, such as in a system battery. In this way, the vehicle may be decelerated using regenerative braking. As such, during the regenerative braking, the engine may be stopped (that is, not spinning and not fueled). During still other decelerative events that occur while the vehicle is in the electric-only mode of operation, the engine may be spun un-fueled to absorb torque. In this way, the vehicle may be decelerated using compression braking. As such, during the compression braking, wheel torque may not be absorbed and stored in a system battery. Thus, in one example, regenerative braking may be used during electric-only decelerative events when a state of charge of the system battery is below an upper limit, while compression braking may be used during electric-only decelerative events when a state of charge of the system battery is greater than the upper limit.

Figure 3:
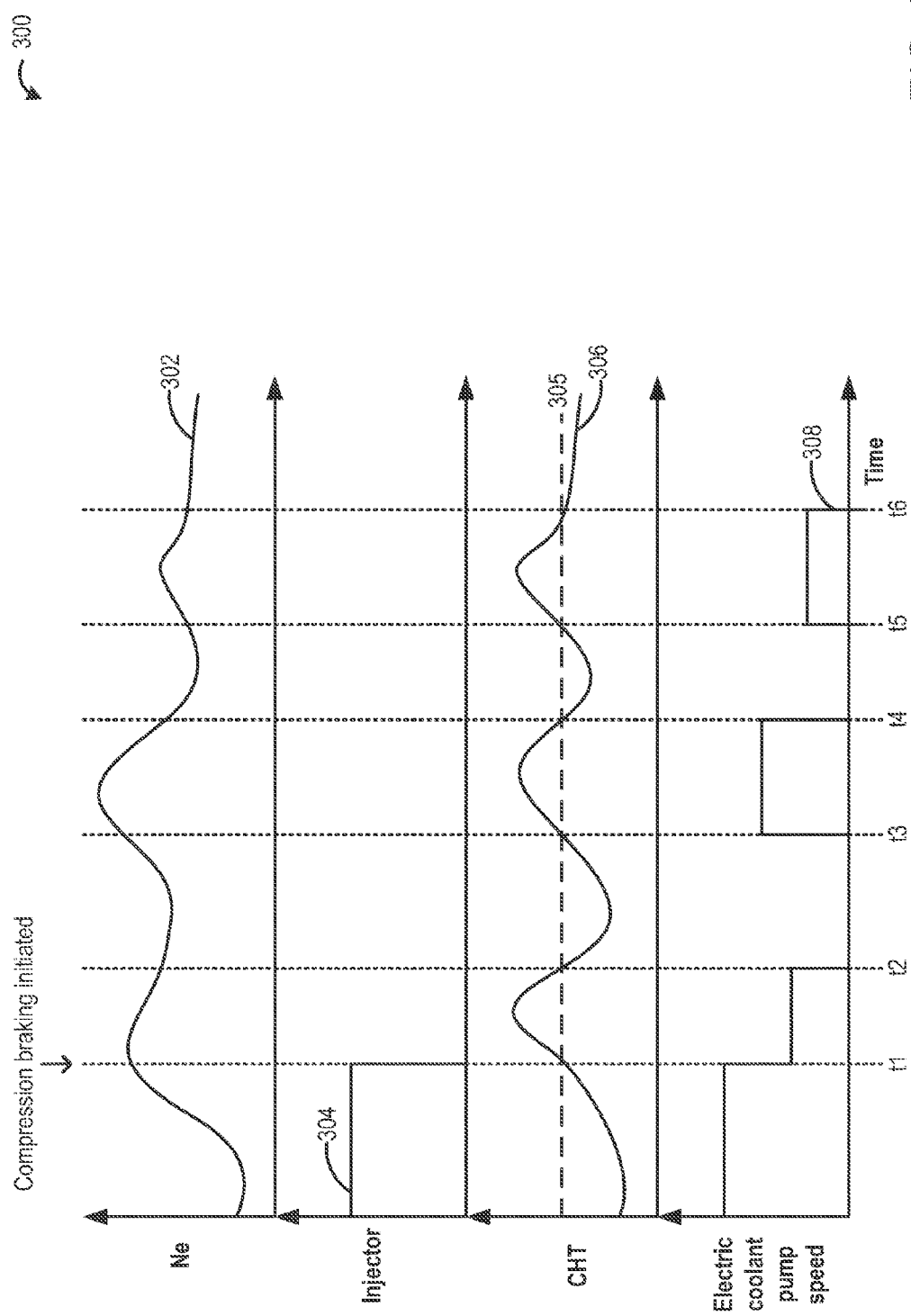
FIG. 3 shows an example coolant pump operation according to the present disclosure.

As elaborated herein, with reference to FIG. 3, during compression braking events, additional waste heat is generated due to the engine absorbing torque. During such conditions, coolant pump 86 may be selectively operated to circulate coolant and control an engine temperature. For example, the pump may be intermittently operated to maintain a cylinder head temperature below a threshold. As such, this enables localized boiling and coolant degradation to be reduced. By using the electric coolant pump to meet substantially all the engine cooling requirements, as well as engine protection, climate control, and heat recovery requirements, the need for an auxiliary coolant pump (e.g., an auxiliary electric or mechanical coolant pump) may be reduced.

FIG. 1 further shows a control system 14. Control system 14 may be communicatively coupled to various components of engine 10 to carry out the control routines and actions described herein. For example, as shown in FIG. 1, control system 14 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 16, which may include user inputs and/or sensors (such as transmission gear position, gas pedal input, brake input, transmission selector position, vehicle speed, engine speed, mass airflow through the engine, ambient temperature, intake air temperature, etc.), cooling system sensors (such as coolant temperature, cylinder head temperature, fan speed, passenger compartment temperature, ambient humidity, etc.), and others. Further, controller 12 may communicate with various actuators 18, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

In this way, the system and components of FIG. 1 enable a method of operating a hybrid vehicle system wherein during conditions when the vehicle is propelled by a motor while the engine spins un-fueled, torque is absorbed at the engine to maintain vehicle speed at a desired speed while operation of an engine coolant pump is adjusted based on the absorbed torque to control an engine temperature. As used herein, controlling an engine temperature may include controlling a cylinder head temperature and/or a coolant temperature. For example, the engine temperature may be maintained below a threshold.

Figure 2:
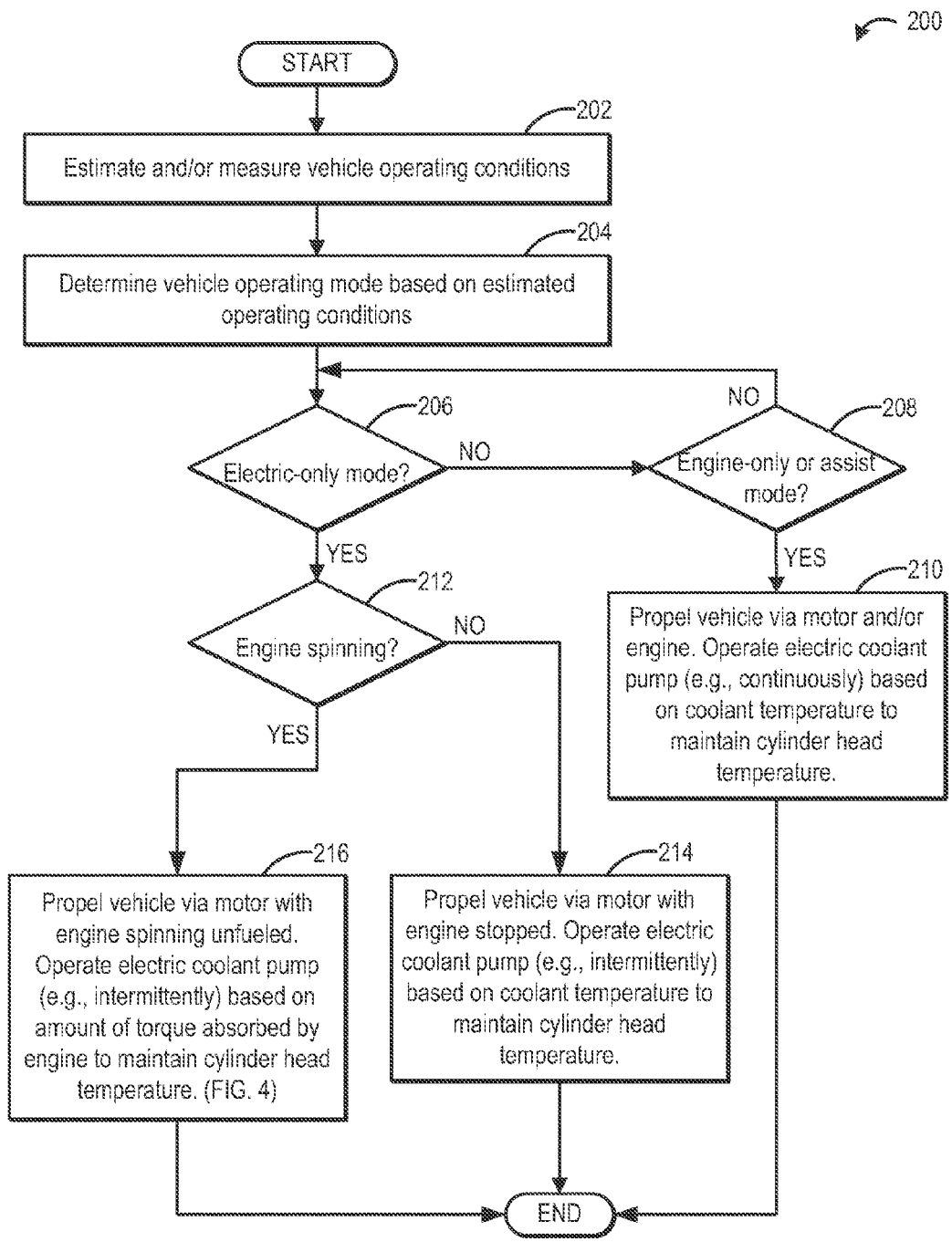
FIG. 2 shows a high level flow chart for adjusting the operation of an engine coolant pump based on engine compression braking torque.

A control routine for operating the electric coolant pump 86 of the vehicle cooling system of FIG. 1 will now be described with reference to FIG. 2. In particular, FIG. 2 depicts routine 200 that enables the electric coolant pump to be selectively and intermittently operated during compression braking to maintain an engine temperature within a threshold.

At 202, the routine includes estimating and/or measuring one or more vehicle operating conditions such as brake pedal position, accelerator pedal position, battery state of charge, engine temperature, ambient temperature and humidity, barometric pressure, etc. At 204, a vehicle operating mode may be determined based on the estimated operating conditions. For example, based at least on the estimated driver torque demand and the battery state of charge, it may be determined whether the vehicle is to be operated in an engine-only mode (with the engine propelling the vehicle), an assist mode (with the battery assisting the engine in propelling the vehicle), or an electric-only mode (with only the motor propelling the vehicle). In one example, if the demanded torque can be provided by only the battery, the vehicle may be operated in the electric-only mode. In another example, if the demanded torque cannot be provided by the battery, the vehicle may be operated in the engine mode, or in the assist mode. The vehicle may accordingly be operated in the determined mode of operation.

At 206, it may be confirmed if the vehicle is in the electric-only mode. If not, then at 208, it may be confirmed that the vehicle is either in an engine-only mode or an assist mode. That is, it may be confirmed that the vehicle is being propelled with at least some torque provided by the engine.

Upon confirmation that the vehicle is being propelled with at least some power from the engine, the routine includes, at 210, during a first condition, propelling the vehicle via at least the engine (for example, via only the engine or via each of a motor and the engine) while operating the electric coolant pump based on coolant temperature (or engine temperature) to cool the engine. For example, during this first condition, the pump may operate continuously while the engine is running, to cool the engine and maintain an engine temperature, or a cylinder head temperature, below a threshold.

Returning to 206, upon confirmation of the electric-only mode, at 212, it may be determined if the engine is spinning during the electric-only mode. The engine may be spinning during the electric-only mode to absorb torque and provide compression braking, for example, during conditions when a state of charge of the system battery is higher than a threshold (such that no further battery charging is required), or when a temperature of the system battery is greater than an upper limit (such that no further battery charging is desired to reduce battery degradation). As such, the amount of torque absorbed by the engine may be adjusted by adjusting engine operating parameters, such as by adjusting one or more of a valve timing, a cam timing, and a transmission gear ratio.

If the engine is not spinning, then at 214, the routine includes, during a second condition, propelling the vehicle via the motor with the engine stopped while operating the electric coolant pump based on coolant temperature to cool the engine. For example, during this second condition, the pump may operate intermittently based on coolant temperature to maintain an engine temperature, or a cylinder head temperature, below the threshold. During the second condition, a frequency of the intermittent pump operation may be based on the coolant temperature. For example, the pump may be operated at intervals when the engine temperature is above the threshold, and for durations that are based on a difference between the engine temperature and the threshold. Thus, as the engine temperature increases above the threshold, the coolant pump may be operated more frequently, and/or for longer durations.

If the engine is spinning at 212, then at 216, the routine includes, during a third condition, propelling the vehicle via the motor with the engine spinning while operating the electric coolant pump based on an amount of torque absorbed by the engine to cool the engine. Herein, the absorbed torque is a compression braking torque. For example, during this third condition, the pump may operate intermittently based on the absorbed torque to maintain an engine temperature, or a cylinder head temperature, below the threshold. Thus, as an amount of torque absorbed increases, a vehicle controller may increase one or more of a coolant pump flow, a pump speed, and a duration of pump operation. In one example, the pump may be operated for a duration based on the engine temperature, a flow and speed of pump operation, and/or a frequency of pump operation based on the engine temperature and the vehicle speed. As such, the amount of torque absorbed may be based on a vehicle speed relative to a desired vehicle speed. Thus, in another example, the pump may be operated intermittently with a speed, and/or a frequency of intermittent operation based on the vehicle speed relative to the desired vehicle speed. Thus, as the amount of torque absorbed by the engine increases, the coolant pump may be operated more frequently, and/or for longer durations.

In still further embodiments, where the vehicle is propelled on an uphill or downhill grade, the adjusting during the third condition may include, as the (uphill or downhill) grade increases, increasing (e.g., further increasing) one or more of a pump flow, a pump speed, and a duration of pump operation to maintain the vehicle speed (at the desired vehicle speed) while also maintaining the cylinder head temperature within a threshold. Herein, the amount of torque absorbed by the engine increases as the grade of vehicle travel increases so as to maintain the vehicle speed at the desired vehicle speed. Accordingly the coolant pump operation is adjusted to dissipate the increased heat generated by the increased torque absorption.

For example, a controller may determine a pump flow command and/or speed command, as well as duration of pump operation based on a current estimate of engine temperature (or current cylinder head temperature). If after running the pump for the commanded duration with the commanded pump speed and flow characteristics, the engine temperature has dropped below a threshold and below the initially estimated temperature, the pump run may be concluded.

However, if after running the pump for the commanded duration with the commanded pump speed and flow characteristics, the engine temperature has not dropped below the threshold and remains at or above the initially estimated temperature, the pump run may be reset based on the revised engine temperature estimate.

The above-discussed coolant pump adjustments performed during compression braking conditions are further explained via the example pump adjustment of FIG. 3. Specifically, map 300 of FIG. 3 depicts changes to an engine speed of a hybrid vehicle at graph 302, changes in engine fueling at graph 304, changes in a cylinder head temperature (CHT) at graph 306, and corresponding adjustments to an electric coolant pump at graph 308.

In the depicted example, prior to t1, the engine may be spinning fueled (see graphs 302 and 304) and the hybrid vehicle may be propelled at least in part using power from the engine. For example, prior to t1, the vehicle may be in an engine-only or in an assist mode. While the engine is running, the electric coolant pump may be continuously operated based on coolant temperature (or engine temperature) to cool the engine (see graph 308).

At t1, the vehicle may be shifted to an electric-only mode and the vehicle may be propelled by the motor only, while the engine continues to spin un-fueled (see graphs 302 and 304). In addition, the engine may start absorbing torque (rather than storing torque in the system battery) such that compression braking is initiated at t1 and continued at least till t6. As the engine absorbs torque, the resulting friction generates additional waste heat that leads to a corresponding increase in engine temperature (herein depicted by an intermittent increase in cylinder head temperature at graph 306). Accordingly, between t1 and t6, while the engine is spinning un-fueled and absorbing torque, to maintain the cylinder head temperature at or below a threshold 305, operation of the coolant pump may be adjusted. Specifically, between t1 and t6, the coolant pump may be intermittently operated based on the amount of torque absorbed so as to maintain the cylinder head temperature at or below threshold 305. As such, when the cylinder head temperature is at or below the threshold 305, pump operation may be discontinued.

As such, the amount of compression braking torque absorbed by the engine may be based at least on the engine speed, and further based on the transmission gear ratio. In the depicted example, between t1 and t6, the transmission may be in the same gear such that amount of torque absorbed by the engine is proportional to the engine speed. Thus, when the engine speed is higher, such as between t3 and t4, the amount of torque absorbed may be higher due to more friction, and consequently a higher coolant pump speed may be used to dissipate the extra heat.

In comparison, when the engine speed is lower, such as between t5 and t6, the amount of torque absorbed may be lower due to lesser friction, and consequently a lower coolant pump speed may be used to dissipate the extra heat. For further comparison, when the engine speed is intermediate, such as between t1 and t2, the coolant pump speed may be adjusted to be in between the higher speeds of t3-t4 and the lower speeds of t5-t6.

It will be appreciated that while the depicted example illustrates the transmission at a first gear ratio, and the coolant pump at a first higher pump speed when the engine is at a first higher engine speed and a second lower pump speed when the engine is at a second lower engine speed, in alternate embodiments, the pump operation may further vary based on the gear ratio selected. For example, in an alternate embodiment, when the transmission is a first, higher gear ratio, the coolant pump may be a first higher pump speed when the engine is at a second, lower engine speed, while when the transmission is at a second, lower gear ratio, the coolant pump may be at a second, lower pump speed when the engine is at a second, higher engine speed.

Likewise, while the depicted example adjusts coolant pump operation via adjustments to the engine coolant pump speed, in alternate examples, coolant pump operation adjustments may include adjustments to one or more of a pump flow, a pump speed, a duration of pump operation, and a frequency of (or interval between) intermittent coolant pump operation.

Further still, the amount of torque absorbed may be determined based on a vehicle speed, and the pump operation accordingly adjusted. For example, operating the coolant pump intermittently may include operating the pump with a speed and/or frequency based on the absorbed torque, the absorbed torque increased as the vehicle speed increases relative to a desired vehicle speed. The absorbed torque may be further based on a grade of vehicle travel, the pump speed and/or frequency increased as the vehicle grade increases.

In this way, a coolant pump may be operated to remove excess heat out of an engine during compression braking based on the amount of torque absorbed. By operating the pump while the engine is compression braking and spinning un-fueled, rather than waiting to run the pump during a subsequent engine-on operation where the engine is spinning fueled, heat build-up at the engine may be reduced. As such, this also reduces the need to operate the coolant pump at higher speeds and flows during the subsequent engine-on operation. By controlling the engine temperatures before the subsequent engine-on operation, pump energy use may be reduced and fuel economy of a hybrid vehicle can be improved. By using an electric coolant pump to meet substantially all the engine cooling requirements, the need for an auxiliary coolant pump (e.g., an auxiliary electric or mechanical coolant pump) may be reduced. Overall, by increasing the amount of coolant flow with increased compression braking torque, it may be possible to better control the cylinder head temperatures while operating the coolant pump more efficiently.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a hybrid vehicle system, comprising:
during conditions when a hybrid vehicle is propelled by a motor and while an engine spins un-fueled, absorbing torque at the engine and not at a system battery to maintain vehicle speed at a desired speed while adjusting operation of an engine coolant pump based on the absorbed torque to control engine temperature, a state of charge of the battery being greater than an upper limit.

2. The method of claim 1, wherein controlling an engine temperature includes maintaining an engine temperature below a threshold.

3. The method of claim 1, wherein a temperature of the system battery is above a threshold temperature.

4. The method of claim 1, wherein the absorbed torque is a compression braking torque, and wherein an amount of torque absorbed is adjusted by adjusting one or more of a valve timing, a cam timing, and a transmission gear ratio.

5. The method of claim 1, wherein the coolant pump is an electric coolant pump, and wherein the adjusting includes, as an amount of absorbed torque increases, increasing one or more of a pump flow, a pump speed, and a duration of pump operation.

6. The method of claim 1, wherein the adjusting includes operating the pump for a duration based on the engine temperature, a flow and speed of pump operation based on the engine temperature and the vehicle speed.

7. The method of claim 6, wherein operating the pump for a duration includes intermittently operating the pump for the duration with a frequency based on the engine temperature and the vehicle speed.

8. The method of claim 1, wherein the hybrid vehicle is propelled on an uphill or downhill grade, and wherein the adjusting includes, as the grade increases, increasing one or more of a pump flow, a pump speed, and a duration of pump operation to maintain the vehicle speed.

9. A method for operating a hybrid a vehicle, comprising:
during a first condition, propelling the vehicle via each of a motor and an engine while operating an electric coolant pump based on coolant temperature to cool the engine;
during a second condition, propelling the vehicle via the motor with the engine stopped while operating the coolant pump based on coolant temperature to cool the engine; and
during a third condition, propelling the vehicle via the motor with the engine spinning un-fueled while operating the coolant pump based on an amount of torque absorbed by the engine to cool the engine.

10. The method of claim 9, wherein the amount of torque absorbed is based on a vehicle speed relative to a desired vehicle speed.

11. The method of claim 10, wherein during the first condition, the pump operates continuously while the engine is running, wherein during the second condition, the pump operates intermittently based on coolant temperature, and wherein during the third condition, the pump operates intermittently with a speed based on the vehicle speed relative to the desired vehicle speed.

12. The method of claim 11, wherein during the second condition, a frequency of intermittent pump operation is based on coolant temperature, and wherein during the third condition, the frequency of intermittent pump operation is based on the vehicle speed relative to the desired vehicle speed.

13. The method of claim 12, wherein during the third condition, the amount of torque absorbed by the engine increases as a grade of vehicle travel increases to maintain the vehicle speed at the desired vehicle speed.

14. A hybrid vehicle system, comprising:
an engine;
a motor;
an electric coolant pump configured to circulate coolant through an engine cylinder head; and
a control system with computer readable instructions for:
when the engine is spinning fueled, operating the coolant pump continuously to maintain a cylinder head temperature; and
when the engine is spinning un-fueled, absorbing torque at the engine to maintain a desired vehicle speed and operating the coolant pump intermittently to maintain the cylinder head temperature, wherein operating the coolant pump intermittently includes operating the pump with a speed and frequency based on the absorbed torque, the absorbed torque increased as a vehicle speed increases relative to the desired vehicle speed.

15. The system of claim 14, wherein the absorbed torque is further based on a grade of vehicle travel, the pump speed and frequency increased as the vehicle grade increases.

16. The system of claim 14, further comprising a system battery, wherein absorbing torque at the engine includes not storing torque in the system battery.

17. The system of claim 16, wherein a state of charge of the battery is higher than an upper limit and a temperature of the battery is higher than a threshold temperature.

* * * * *